US008682126B2

(12) United States Patent
Samartsev et al.

(10) Patent No.: US 8,682,126 B2
(45) Date of Patent: Mar. 25, 2014

(54) METHOD FOR ASSEMBLING HIGH POWER FIBER LASER SYSTEM AND MODULE REALIZING THE METHOD

(75) Inventors: Igor Samartsev, Westborough, MA (US); Victor Ilyashenko, Northborough, MA (US); Davone Keovongmanysar, Oxford, MA (US)

(73) Assignee: IPG Photonics Corporation, Oxford, MA (US)

( * ) Notice: Subject to any disclaimer, the term of this patent is extended or adjusted under 35 U.S.C. 154(b) by 64 days.

(21) Appl. No.: 13/193,768

(22) Filed: Jul. 29, 2011

(65) Prior Publication Data

US 2013/0028274 A1 Jan. 31, 2013

(51) Int. Cl.
*G02B 6/02* (2006.01)
*H01S 3/30* (2006.01)

(52) U.S. Cl.
USPC ............................................... 385/123; 372/6

(58) Field of Classification Search
USPC ............... 385/49, 31, 32, 38, 39, 47, 50, 123; 372/6; 156/60
See application file for complete search history.

(56) References Cited

U.S. PATENT DOCUMENTS

| | | | | |
|---|---|---|---|---|
| 6,052,392 | A * | 4/2000 | Ueda et al. | 372/6 |
| 6,174,648 | B1 * | 1/2001 | Terao et al. | 430/321 |
| 6,795,460 | B1 * | 9/2004 | Itoh | 372/6 |
| 6,798,792 | B2 * | 9/2004 | Itoh | 372/6 |
| 7,769,058 | B2 * | 8/2010 | Hongo et al. | 372/6 |
| 7,903,695 | B2 * | 3/2011 | Kojima et al. | 372/6 |
| 2002/0001320 | A1 * | 1/2002 | Itoh | 372/6 |
| 2007/0053640 | A1 * | 3/2007 | Goell et al. | 385/123 |
| 2007/0189340 | A1 * | 8/2007 | Hongo et al. | 372/6 |
| 2009/0296746 | A1 * | 12/2009 | Heaton et al. | 372/6 |
| 2011/0310469 | A1 * | 12/2011 | Nagayasu | 359/341.3 |
| 2012/0301097 | A1 * | 11/2012 | Nakano et al. | 385/134 |
| 2013/0028274 | A1 * | 1/2013 | Samartsev et al. | 372/6 |
| 2013/0028276 | A1 * | 1/2013 | Minelly et al. | 372/6 |

FOREIGN PATENT DOCUMENTS

| | | | |
|---|---|---|---|
| CN | 101867143 A | | 10/2010 |
| JP | 59180519 A | * | 10/1984 |
| JP | 2007156097 A | * | 6/2007 |
| RU | 2168191 C1 | | 5/2001 |
| RU | 2201024 C2 | | 3/2003 |

OTHER PUBLICATIONS

International Search Report, dated Feb. 24, 2012.

* cited by examiner

*Primary Examiner* — Charlie Peng
(74) *Attorney, Agent, or Firm* — Yuri Kateshov; Timothy J. King

(57) ABSTRACT

A method for arranging a high power fiber laser system includes spiraling an active fiber in a housing with a diameter of spiral gradually decreasing towards the center of the housing. The method further includes coupling the opposite free ends of the spiraled active fiber to respective passive fibers providing optical communication between the active fiber and discrete components. Thereafter, the passive fibers with the discrete components are arranged next to inner spirals of the active fiber.

20 Claims, 2 Drawing Sheets

METHOD FOR ASSEMBLING HIGH POWER FIBER LASER SYSTEM AND MODULE REALIZING THE METHOD

CROSS REFERENCE TO RELATED APPLICATIONS

This application claims priority to PCT Application No. PCT/RU2011/000567 filed with the Russian Patent Office on Jul. 27, 2011.

BACKGROUND OF THE DISCLOSURE

1. Field of the Disclosure

The disclosure relates to a laser technology, and more particularly to manufacturing high power fiber lasers operating within a kilowatt range.

2. Technical Background

The operation of kW power fiber lasers is accompanied by heat generation. The techniques for minimizing detrimental effects of heat on fibers and components of HPFLS generally include water and air chillers configured to conduct heat away from a fiber module. Typically, a fiber module is configured with a housing enclosing active and passive fiber along with other components of HPFLS.

One of the known techniques relates to a micro-channel means for cooling HPFLS configured with inner and outer chillers such as metallic structures with a fiber laser which is located between the chillers. The chillers are coupled to one another by metallic links conducting heat away from the fiber laser. A multiplicity, of chillers may render this technique cost- and labor-ineffective. Automation of the micro-channel means may not be possible. Furthermore, fibers may be mechanically damaged during assembling the chillers.

Another known technique is disclosed in CN 101867143 (A) and teaches placing an active fiber of HPFLS in a plurality of spiral grooves formed in a flat bottom of metallic housing. A fiber combiner coupling passive fibers which deliver pump light to the active fiber is also mounted in the same groove as the active fiber. A high thermo-conductive gel is then poured into the housing to bond the components together and protect them from mechanical damages. The manufacturing of grooves is time-consuming and not always sufficient or conversely excessive for given fiber lengths. Metal treatment is also may not be safe for delicate fibers with relatively sharp edges of the groove. Excessive stresses resulting from temperature-dependent compressions and expansions of both metal and fiber components may also have detrimental effects the system.

A need, therefore, exists for a method of assembling components of a high power fiber laser system which is labor- and cost effective, provides reliable protection of the components from mechanical and thermal stresses and effectively evacuates heat.

A further need exists for a fiber laser module configured in accordance with the disclosed method.

SUMMARY OF THE DISCLOSURE

These needs are addressed in the present disclosure teaching assembling a high power fiber laser system ("HPFLS") which is based on inherent resiliency of fiber. In particular fiber and fiber components of the HPFLS are spirally laid on the bottom of a cap-shaped housing made from highly thermo-conductive material.

In accordance with one aspect of the disclosure a layer of adhesive material, such as silicone gel, i.e. soft material, that is applied to at least part of the bottom so as to prevent the later assembled fiber components from significant voluntary displacement relative to the bottom and one another. The bottom and active fiber, i.e., fiber doped with ions of rare-earth ions, may be rotational relative to each other. In particular, the housing revolves about an axis of rotation as the fiber is being delivered and arranged on the bottom. The fiber is unwound from a spool and arranged on the bottom as a planar spiral with a distance to the central axis continuously decreasing from the periphery of the bottom.

The windings of the spiral are tightly pressed against one another with the outer peripheral winding having the largest diameter and the inner winding having the smallest diameter. Due to inherent resiliency of curved fiber, the winding are slightly displaced towards the axis without any appreciable stress, which may be present in a grooved bottom of the known prior art. Once the windings are in contact with one another, their displacement stops.

BRIEF DESCRIPTION OF THE DRAWINGS

The above and other features and advantages of the disclosed method and apparatus will be more readily apparent from the following specific description accompanied by the drawings in which.

SPECIFIC DESCRIPTION

Figure 1:
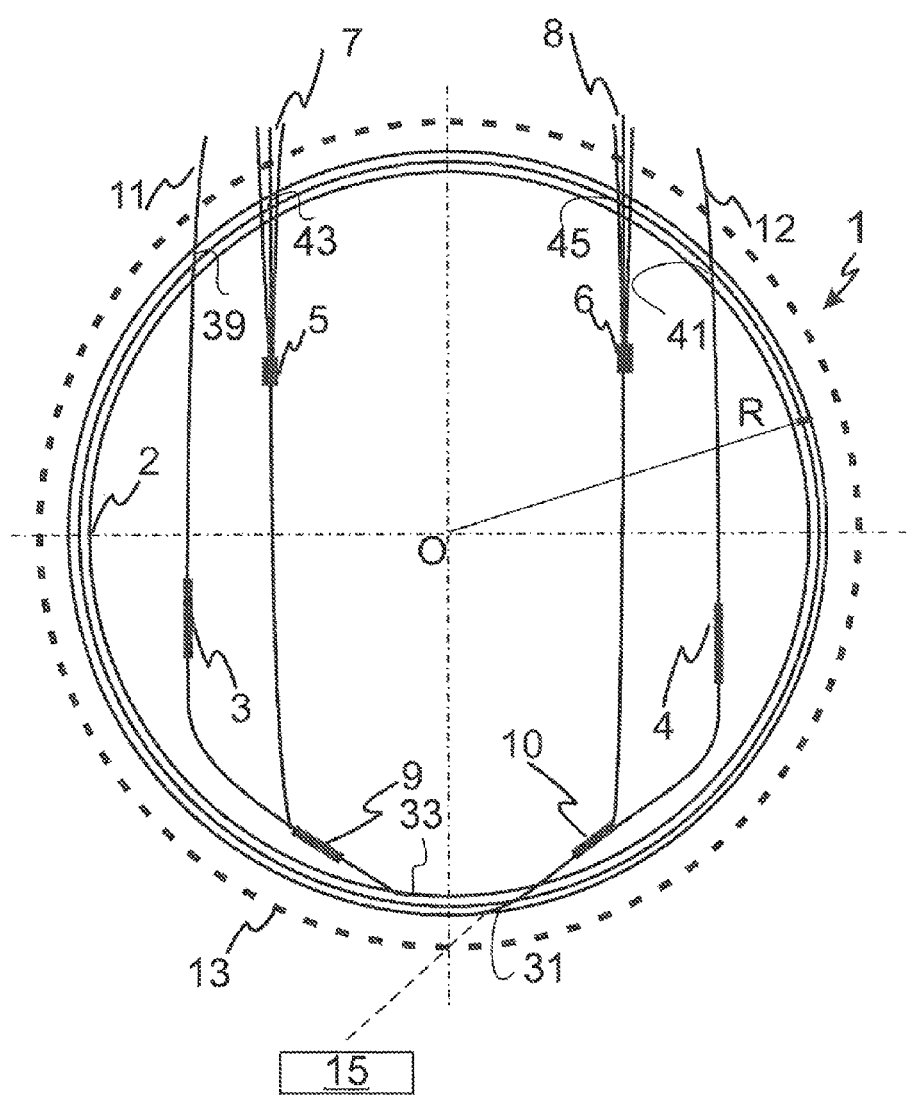
FIG. 1 a top view of the HPFLS configured on the bottom of the disclosed module.

Reference will now be made in detail to several exemplary embodiments of the invention, and examples of which are illustrated in the accompanying drawings. Whenever possible, the same reference numerals will be used throughout the drawings to refer to the same or like parts.

Figure 2A:
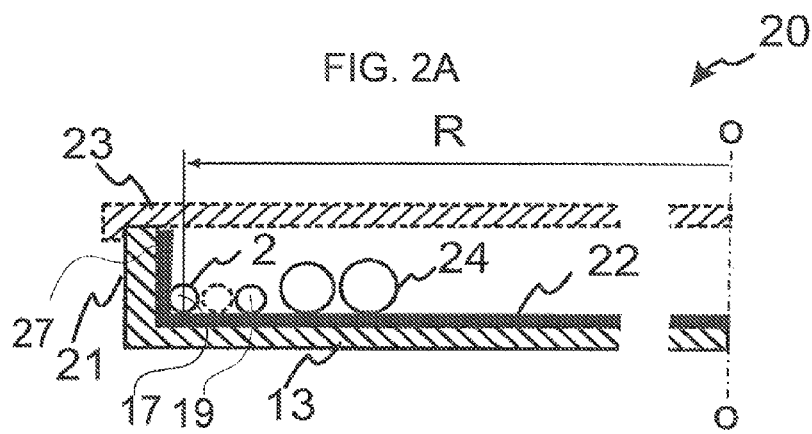
FIG. 2A is an elevated side view of the assembled HPFLS in accordance with one embodiment of the disclosure.

Referring to FIGS. 1 and 2A a disclosed fiber block 1 of HPFLS is capable of outputting a kW beam. The block 1 includes an annular U-shaped housing 20 (FIG. 2A) configured with a flat bottom 13, peripheral wall 21 and a removable lid 23. The housing 20 is made from highly thermo-conductive material, such as metal.

A layer of adhesive material 22 (FIG. 2A) including among others a silicone gel is applied to bottom 13. Thereafter an active fiber 2 is supplied from a spool 15 (FIG. 1) through one of openings 39 or 41 of or simply guided over the peripheral wall 21 (FIG. 2A). The spool 15 is rotated in response to a tension force applied to a free end 31 (FIG. 1) of fiber 2.

The housing 20 (FIG. 2A) may be rotatable about an axis of rotation O-O. The leading end of fiber 2 is placed so that the stretch of the fiber, next to leading free end 31, is laid down on adhesive 22 adjacent to peripheral wall 21 whose inner surface serves as a guiding surface for active fiber 2 as housing 20 continues to rotate. During rotation, initially an outer winding 17 of active fiber 2 is formed with a largest radius R and then a plurality of inner windings are arranged next to one another on bottom 13 with respective progressively decreasing diameters. Alternatively, the spiral may provided by first forming an inner winding with the smallest diameter which progressively increases towards the periphery. Formation of the windings continues until an inner winding 19 is laid down on bottom 13. In the end, active fiber 2 is arranged on bottom 13 in a single-layer planar spiral that, depending on a method of supplying fiber 2, has a configuration selected from Archimedean, Fermat and other suitable known types of spiral. Optical fibers including active fiber 2 are inherently resilient under tensile forces when curved. This resilience causes slight sliding of a previous winding towards a subsequent winding. As a result, the winding are placed side by side in contact with one another. The adhesive 22 may also be applied to a surface region 27 of peripheral wall 21 next to bottom 13. Accordingly, the layer of adhesive 22 may have an L-shaped form with outer winding 17 thus coupled not only with bottom 13 but also with wall 21.

Returning to FIG. 1, leading and trailing ends 31 and 33, respectively of fiber 2 may or may not be immediately affixed to bottom 13 by adhesive 22 during formation of spiral. These ends are first coupled to respective ends of input and output passive fibers 11, 12 forming thus respective spliced 9 and 10. If the desired length of active fiber 2 is wound on the spool, it may be possible to splice at least its leading end 31 or both opposite ends 31, 33 to respective passive fibers before the formation of the spiral. More often, however, active fiber 2 has a great length wound on the spool and exceeding the desired length. In this case, both ends may be spliced to respective ends of input and passive fibers 11, 12, respectively after the formation of the spiral. In either case, once spliced, passive fibers 11, 12 along with respective leading and trailing ends of fiber 2 are placed on adhesive layer 22 (FIG. 2A) so that each passive fiber has as large a radius of its curved stretch as possible to minimize bending losses. If the HPFLS is configured as an oscillator, passive fibers 11 and 12, respectively, are provided with fiber Brag gratings ("FBGs") 3 and 4 (FIG. 1). Of course, no FBGs are needed for a fiber amplifier. The lengths of respective passive fibers extending within housing 20 are brought into contact with adhesive 22. As can be seen, the passive fibers extend across bottom 13 with respective ends traversing openings 39, 41 (FIG. 1) provided in peripheral wall 21 which are typically provided above outer winding 17 of active fiber 2.

The peripheral wall 21 further may be provided with additional openings 43, 45, respectively which are traversed by a plurality of pump light delivery fibers 7 and 8. The inner ends of respective pump light delivery fibers are combined together by combiners 5 and 6, respectively. The stretches of respective pump light fibers located within housing 20 are affixed to bottom 13 by means of adhesive 22 between passive fibers 11 and 12, respectively. The output fibers of respective combiners 5 and 6 each are further spliced to the end of active fiber 2 as indicated by splices 9 and 10.

FIG. 2A illustrates a lid 23 covering wall 21. The lid 23 may be mounted on wall 21 by having the inner surface of flange 49 screwed on outer surface 51 of the wall. Alternatively, it may be coupled by press-fitting it onto the wall. Still a further alternative to use an outer latch removably coupling the lid to the rest of module 1.

Figure 2B:
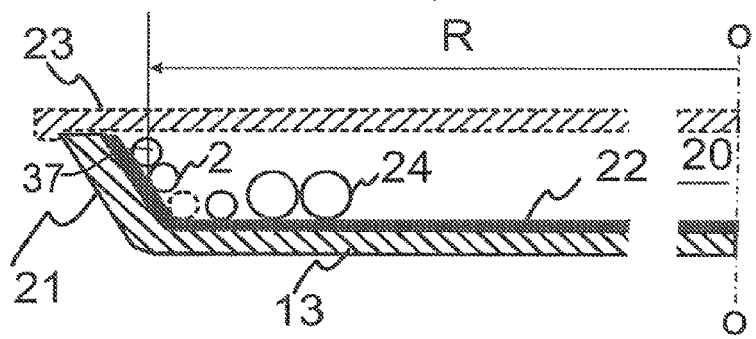
FIG. 2B is an elevated side view of the assembled HPFLS in accordance with another embodiment of the disclosure.
Figure 2C:
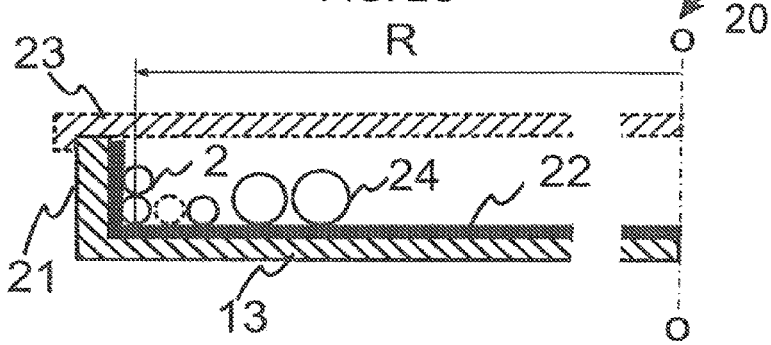
FIG. 2C is an elevated side view of the assembled HPFLS in accordance with a further embodiment of the disclosure.

FIGS. 2B and 2C illustrate respective configurations of housing 20. FIG. 213 shows wall 21 extending from bottom 13 at an obtuse angle. The configuration of the spiral is somewhat different from that one of FIG. 1 and includes additional windings 37 adhered to the surface of wall 21. FIG. 2C is similar to FIG. 2A, but, like FIG. 2B, illustrates additional windings provided along wall 21 one upon another. A variety of optical components 24 are positioned next to the inner peripheral winding of active fiber 2.

Although the present disclosure has been described in terms of the disclosed example, numerous modifications and/ or additions to the above-disclosed embodiments would be readily apparent to one skilled in the laser arts without departing however from the scope and spirit of the following claims.

The invention claimed is:

1. A method for packaging a high power fiber laser system ("HPFLS"), comprising:
   covering a flat bottom of a housing with a layer of adhesive;
   rotating the housing and an active fiber of the HPFLS relative to one another about an axis of rotation while curving the active fiber on the layer of adhesive, so that the active fiber winds around the axis at a continuously increasing or decreasing distance from the axis, thereby forming a spiral affixed to the bottom.

2. The method of claim 1 further comprising coupling opposite ends of the active fiber to respective input and output passive fibers within the housing before or after forming the spiral and placing the passive fibers on the layer of adhesive, thereby coupling the passive fibers to the bottom of the housing.

3. The method of claim 2, wherein the passive fibers extend across the bottom of the housing.

4. The method of claim 1, wherein the housing has an annular peripheral wall, delimiting the bottom, and is made from thermoconductive material.

5. The method of claim 2 further comprising guiding the passive fibers through respective openings in the peripheral wall.

6. The method of claim 2 further comprising providing the housing with a lid spaced from the active, passive fibers and components.

7. The method of claim 2, wherein the passive fibers each have at least one fiber Brag grating.

8. The method of claim 2 further comprising combining passive fibers delivering pump light into a combiner on the bottom of the housing on and further coupling an output fiber of the combiner to the active fiber.

9. An optical module comprising:
   a housing having a flat bottom;
   a layer of adhesive material applied at least to a region of the bottom;
   a spiral of an active fiber provided on the bottom in the adhesive material;
   a pair of passive fibers coupled to respective opposite ends of the active fiber in the housing and having respective free ends terminating outside the housing.

10. The optical module of claim 9, wherein the passive fibers each have at least one fiber Brag grating within the housing.

11. The optical module of claim 9, wherein the housing has an annular peripheral wall rising from the bottom and a lid removably mounted to the peripheral wall at a distance from the active, passive fibers and optical components.

12. The optical module of claim 11, wherein the bottom of the housing is made from material with a high thermo-conducting coefficient.

13. The optical module of claim 9, wherein the spiral is selected from Archimedean or Fermat configuration.

14. The optical module of claim 10, wherein an inner surface of the peripheral wall is a guiding surface for an outer winding of the spiral having a maximum diameter.

15. The optical module of claim 9, wherein the peripheral wall of the housing has a plurality of openings traversed by respective free ends of the passive fibers.

16. The optical module of claim 9, wherein the plurality of passive fibers include signal and pump light delivery fibers coupled to the active fiber inside the housing and placed in the adhesive material.

17. The optical module of claim 9, wherein the layer of adhesive extends over a portion of a peripheral wall next to the bottom of the housing, the spiral has a plurality of windings extending from an outer winding formed on the portion of the peripheral wall to an inner winding provided on the bottom.

18. The optical module of claim 9, wherein the adhesive material is a soft gel.

19. The method of claim 1, wherein the spiral is planar and selected from Archimedean or Fermat configuration.

20. The method of claim 2, wherein an outer winding of the spiraled active fiber conforms an inner surface of the peripheral wall.

\* \* \* \* \*